G. C. DAVISON.
SPRAY VALVE FOR DIESEL ENGINES.
APPLICATION FILED MAR. 17, 1916.
1,258,096.
Patented Mar. 5, 1918.
2 SHEETS—SHEET 1.
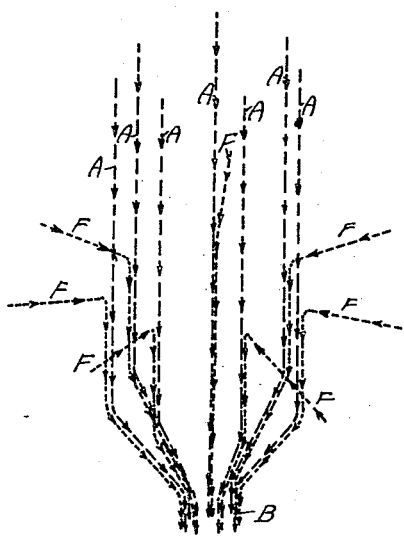
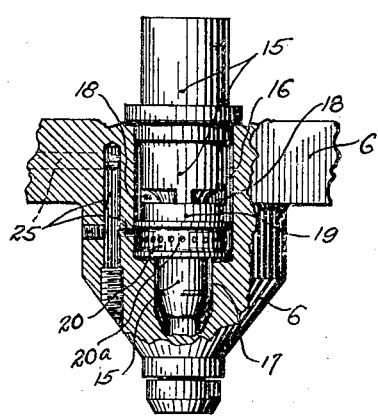
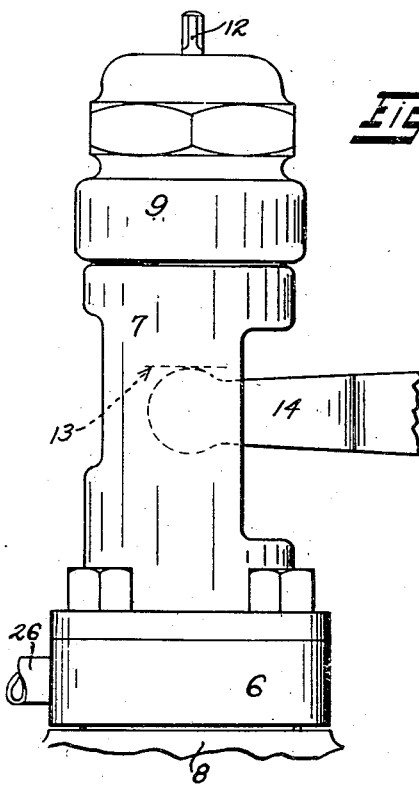
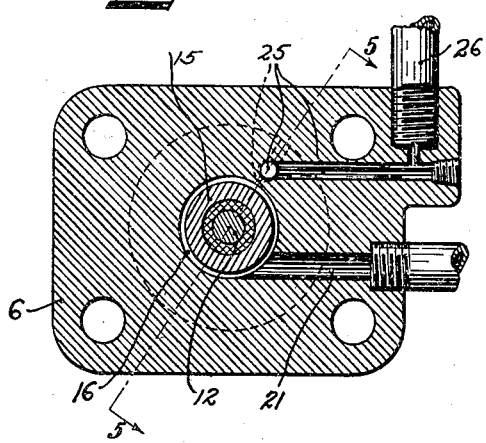
INVENTOR
G. C. Davison,
BY
Russie Davis Marvin
ATTORNEYS.

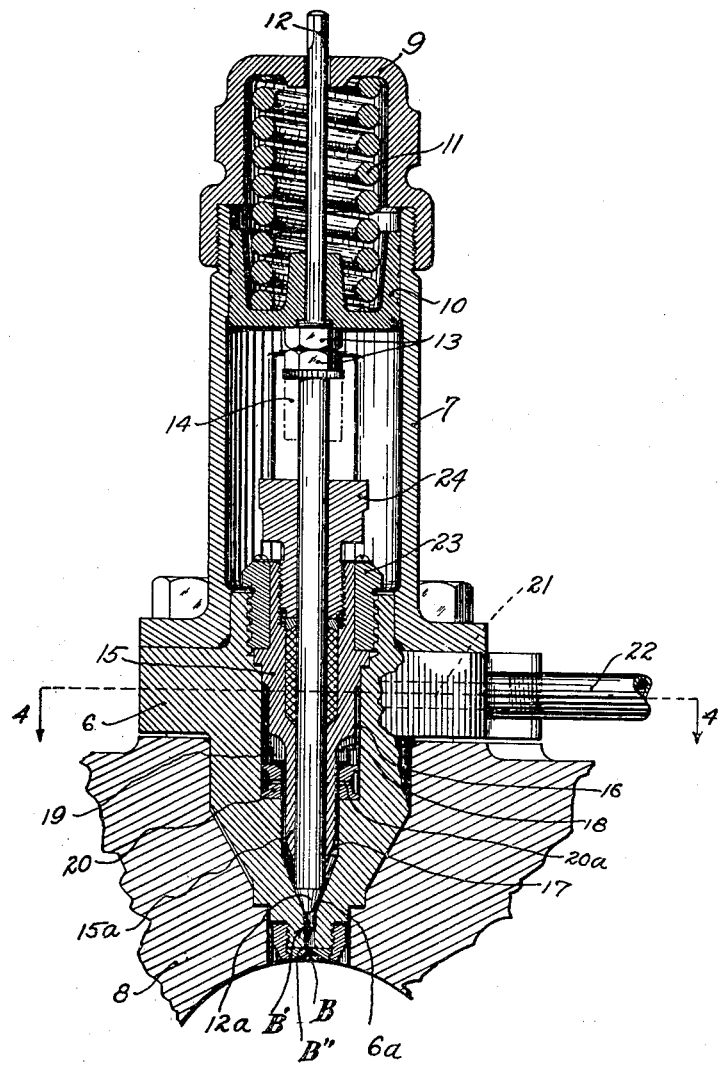

UNITED STATES PATENT OFFICE.

GREGORY C. DAVISON, OF NEW LONDON, CONNECTICUT, ASSIGNOR TO ELECTRIC BOAT COMPANY, OF NEW YORK, N. Y., A CORPORATION OF NEW JERSEY.

SPRAY-VALVE FOR DIESEL ENGINES.

1,258,096.  Specification of Letters Patent.  Patented Mar. 5, 1918.

Application filed March 17, 1916. Serial No. 84,798.

*To all whom it may concern:*

Be it known that I, GREGORY C. DAVISON, a citizen of the United States, and a resident of New London, in the county of New London and State of Connecticut, have invented certain new and useful Improvements in Spray-Valves for Diesel Engines; and I do hereby declare the following to be a full, clear, and exact description of the invention, such as will enable others skilled in the art to which it appertains to make and use the same.

This invention relates to internal combustion engines using heavy oils as fuel, and is directed to the provision of an improved method of and means for injecting the fuel into a combustion chamber of such an engine. In engines of this type, a cylinder is filled with air which is highly compressed before the oil-fuel is injected. As a consequence of the high compression, the temperature of the air becomes very high, so that upon injection of the oil-fuel, the contents of the cylinder's combustion chamber ignite and their combustion effects a great increase in the temperature within the cylinder. The power of the engine is dependent upon this high temperature developed within the cylinder and the resultant expansion of the gases and therefore the thoroughness of the combustion of the fuel is of the greatest importance. The combustion of the fuel is more efficient in proportion as the fuel is more finely divided in the air into which it is injected and it is the aim of this invention to disclose a process of and apparatus for injecting the oil-fuel whereby the fuel is divided into a multiplicity of very minute particles. The process involves forcing the fuel-oil under high pressure into a moving body of air which is preferably in the form of a thin sheet and which is caused to move at relatively high velocity into the combustion chamber of the cylinder when the fuel-inlet valve is opened.

The process will be better understood by reference to the following description of the preferred form of apparatus employed in practising the process and which is to be read in connection with the accompanying drawings.

In these drawings,

Figure 1 is a diagrammatic representation of the flow of the compressed air and the fuel through the inlet valve; Fig. 2 is a side elevation of the valve mounted upon the cylinder of the engine; Fig. 3 is a vertical sectional view of the valve through the axis of the valve-stem; Fig. 4 is a transverse sectional view, taken on the line 4—4 of Fig. 3; and Fig. 5 is a vertical sectional view, taken on the line 5—5 of Fig. 4.

Referring now to Fig. 1 for the purpose of describing the process therein illustrated, the arrow streams A represent elements of a current of air which is being driven into the cylinder under high pressure (preferably under a pressure of between 900 and 1000 pounds per square inch) and substantially as a tubular stream-column defined by an infinite number of said elements; and the arrow streams F represent elements of a flow of fuel which is forced under high pressure, preferably somewhere above the maximum air pressure, into the tubular stream and at a considerable angle thereto, preferably at right angles thereto, and with each oil-fuel stream preferably directed radially of the tubular column and with all of said streams F preferably arranged in a common plane perpendicular to the axis of the tubular column. By means of the procedure thus briefly described, the oil-fuel is broken up into very many and very minute particles. Preferably thereafter the tubular column, now characterized by the presence of said particles, continues to be driven by the air streaming at high pressure as aforesaid, and is caused to impinge against a downwardly tapering conical surface arranged preferably concentrically with and below the tubular column. The particles of oil-fuel are thereby further broken up and deflected by the conical surface as shown in the drawing, so that the fuel-spray stream is contracted, gains extremely high velocity at B, and enters the cylinder to be thoroughly consumed with high efficiency upon contact with the compressed and heated air therein.

The process thus described is effective to a high degree in causing the admission of the fuel in a form which is most conducive to thorough combustion and the development of a large amount of power in proportion to the fuel consumed. A form of valve structure which may be employed in practising this process and which I prefer to employ is illustrated in Figs. 2 to 5. In these figures, the references 6 and 7 represent, respectively, a valve-supporting member and a piston-guiding member. The member 6 is set into one of the cylinders 8, as shown in Fig. 3, the combustion chamber of the cylinder being preferably located immediately below the inlet orifice B, Figs. 1 and 3.

The upper end portion of the member 7 is exteriorly threaded so that there may be mounted thereon as illustrated a cap-piece 9, which, with the piston 10, forms a receptacle for an expansile spring 11. The piston 10 is mounted upon a valve stem 12 and is held against movement longitudinally thereon by means of nuts 13 and the spring 11.

The lower end of the valve stem 12 is conical as shown at 12$^a$ and the stem is urged by spring 11 in a direction to carry the conical lower end into contact with a valve seat 6$^a$ formed in member 6. Thus the orifice B is normally closed, and is opened only at suitable intervals when a valve-actuating lever 14 is rocked on its pivot to exert upward pressure against the under side of the lower nut 13. The terminus of lever 14, shown in broken lines in Figs. 2 and 3, is bifurcated so as to straddle the valve stem 12 and the side wall of member 7 is vertically slotted as shown in Figs. 2 and 3 to permit entrance and proper operation of the end of lever 14.

The valve stem 12 slides through a valve stem guide 15 which, with the member 6, forms a pair of annular chambers 16 and 17 of different diameters. These chambers communicate with each other by way of a plurality of circumferentially spaced passages 18 (Figs. 3 and 5). These passages 18 are formed in the guide 15 and are separated by ribs integral with the guide. A thin ring 19 is placed upon the guide 15, as shown in Figs. 3 and 5, bearing upon the ribs above referred to but not extending to the upper ends of the ribs so that the entrances to the passages 18 are above the ring 19. The shape of the ribs is indicated by Fig. 3 in which two of the ribs are shown in elevation and that figure also shows the ring 19 in section mounted on the ribs. The lower annular chamber 17 is extended upward to the lower ends of the ribs within a spool 20, the purpose of which will be hereinafter described.

The compressed air for spraying the oil-fuel enters the annular chamber 16 through a pipe 22 and passage 21 (Figs. 3 and 4) and passes through the ports 18 to the chamber 17. Within the chambers 16 and 17, the moving body of air is a thin sheet approximating the form of a tube as described above in connection with Fig. 1.

The guide 15 is held in place by means of a ring 23 having a threaded engagement with the member 6 so as to make an airtight joint between the interior of member 7 and the interior of annular chamber 16. A lock-nut 24 is threaded into the guide 15 to provide means for compressing a packing lying in a pocket in guide 15 and surrounding the valve stem 12 to prevent air leakage upwardly along the stem.

The spool 20 has a circumferential groove which forms an annular conduit between the rims of the spool and the inner surface of member 6, and the spool is preferably so well and tightly fitted in member 6 that the rims or flanges of the spool make a fluid-tight closure about the annular conduit.

The oil-fuel is led through passages 25 (Figs. 4 and 5) formed in the member 6 and enters the annular chamber about the spool 20. From this chamber, the fuel, which is under high pressure, passes through a great number of radially arranged ports 20$^a$ into the chamber 17. The ports or ducts in the spool 20 divide the fuel into a plurality of jets or fuel streams flowing radially inward as indicated by the arrows F of Fig. 1 and described in connection with that figure. The fuel issuing from the passages 20$^a$ is taken up in the form of minute particles by the annular stream of air in chamber 17 as that stream flows downwardly past the parts 20$^a$. Below the spool 20, the chamber 17 is contracted in size by forming the lower end of the bore in member 6, including the valve-seat 6$^a$, of conical shape.

To aid further in increasing the subdivision of the fuel-spray, the orifice or spray-inlet port B below the valve stem, may be further contracted, as shown at B′ in Fig. 3, and the orifice may be provided with a removable nozzle, the opening through which is of still smaller size as shown at B″ in Fig. 3.

The operation of the parts above described may be summarized as follows. At suitable intervals during operation of the engine and just prior to the raising of the valve stem 12 to open the orifice B, a proper quantity of oil-fuel is forced under very high pressure into the annular conduit between the rims of spool 20, and then through the jet-ports 20$^a$. When the valve 12 is raised from its seat, air under high pressure flows at high velocity through pipe 21, chamber 16, passages 18, chamber 17 to the orifice B. The oil from jets 20ᵃ meets this moving body of air while traveling at right angles thereto. The air is in a thin layer or sheet and the streams of oil are very small so that the oil is taken up by the air in the form of very minute particles. These particles are further broken up as the mixture impinges against the conical surface of the upper portion of the valve-seat 6ᵃ and as the mixture thereafter passes through the contracted orifice B; the charge of oil-fuel thus treated then enters the cylinder at the proper time with relation to the compression of the air contents of the cylinder.

I claim:—

1. In a fuel-spray valve, the combination of a casing having a valve-seat, a valve-member coacting therewith, a tubular passage through the valve leading to said seat, means for carrying air under pressure to said passage, a plurality of ducts for oil each entering said passage at substantially right angles thereto and means for supplying oil under pressure to said duct.

2. In a fuel-spray-valve, the combination of a casing, a valve-member therein coacting with a seat on the casing, a chamber between the casing and member, an annulus within the casing surrounding the member and forming an annular space between the annulus and the member which space is connected to said chamber, a receptacle for oil formed by the annulus, a plurality of ducts passing through the annulus, means for supplying oil to said receptacle, and means for supplying air to said chamber.

3. In a fuel-spray valve, the combination of a casing having a valve-seat, a valve-stem carrying a member adapted to coact with the seat, a passage surrounding the stem and leading to the seat, means for carrying air under pressure to the passage, a receptacle for oil surrounding the passage and provided with a plurality of ducts connecting the receptacle with the passage and entering the passage at substantial angles thereto and means for supplying oil to said receptacle.

4. In a fuel-spray valve, the combination of a casing, a valve-stem, a valve-stem guide entering the casing and having a reduced portion sleeving the stem but forming an annular space between it and the casing, means for carrying air under pressure to the space between the casing and guide, an annular member in said space through the center of which said air passes and which has an annular receptacle therein, means for supplying oil to said receptacle, and a plurality of ducts in said member through which the oil passes into the space between the casing and guide.

5. In a fuel-spray valve, the combination of a casing, a valve-stem guide entering the same, a stem passing through the guide and coacting with a seat on the casing, means for carrying air under pressure to the space between the casing and guide, a spool-shaped member fitting within the casing and surrounding the guide, means for supplying oil to the interior of said member, and a plurality of ducts in said member through which oil passes to the space between the casing and guide.

6. In a fuel-spray valve, the combination of a valve-stem, a valve-seat, a first annular chamber located above the valve-seat, an oil-feeding conduit leading to the first chamber, a second annular chamber located adjacent the first chamber and of less internal diameter than the first chamber, a compressed-air-feeding conduit leading to the second chamber, a plurality of radially-arranged ducts connecting said chambers and through which the oil flows so as to intersect substantially at right angles the compressed air flowing through the second chamber.

7. In a fuel-spray valve, the combination of a valve-stem, a valve-seat, a first annular chamber located above the valve-seat, an oil-feeding conduit leading to the first chamber, a second annular chamber located adjacent the first chamber, a compressed-air-feeding conduit leading to the second chamber, a plurality of radially-arranged ducts connecting the chambers and through which the oil flows so as to intersect the compressed air flowing through the second chamber, and a tapering conical chamber located below the second chamber and above the valve-seat and presenting a surface against which the contents of the second chamber may impinge to be deflected toward the axis of the conical chamber.

8. In a fuel-spray valve, the combination of a casing, a valve-seat in the lower part of the casing, a valve-stem, a valve for said valve-seat carried by the valve-stem, a spring urging the valve toward its seat, a valve-stem guide carried within the casing, an annular chamber between the lower portion of the guide and said casing, and extending to the valve-seat, means for feeding air to the upper part of said chamber, an annular conduit surrounding said chamber, means for feeding oil into said conduit, and a plurality of radially-arranged ducts connecting said conduit and said chamber.

9. In a fuel-spray valve, the combination of a casing, a valve-seat in the lower part of the casing, a valve-stem, a conical valve for the valve-seat carried by the valve-stem, a spring urging the valve to its seat, a valve-stem guide carried within the casing, an annular chamber between the guide and casing, said chamber communicating with the valve-seat, means for feeding air to the upper part of said chamber, an annular conduit surrounding the chamber, means for feeding oil into the conduit, a plurality of radially-arranged ducts connecting said conduit and said chamber, the axes of said ports lying in a common plane perpendicular to the axis of the chamber, a conical deflector located below the annular chamber and above the valve-seat, and a port located below the valve-seat and which is more contracted at its lower than at its upper end.

In testimony whereof I affix my signature.

GREGORY C. DAVISON.